US011847510B2

(12) United States Patent
Coviello et al.

(10) Patent No.: US 11,847,510 B2
(45) Date of Patent: Dec. 19, 2023

(54) SYSTEM FOR APPLICATION SELF-OPTIMIZATION IN SERVERLESS EDGE COMPUTING ENVIRONMENTS

(71) Applicant: NEC Laboratories America, Inc., Princeton, NJ (US)

(72) Inventors: Giuseppe Coviello, Robinsville, NJ (US); Kunal Rao, Monroe, NJ (US); Biplob Debnath, Princeton, NJ (US); Srimat Chakradhar, Manalapan, NJ (US)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 17/964,170

(22) Filed: Oct. 12, 2022

(65) Prior Publication Data

US 2023/0153182 A1 May 18, 2023

Related U.S. Application Data

(60) Provisional application No. 63/279,020, filed on Nov. 12, 2021.

(51) Int. Cl.
*G06F 9/44* (2018.01)
*G06F 9/54* (2006.01)
*G06F 9/50* (2006.01)

(52) U.S. Cl.
CPC .............. *G06F 9/543* (2013.01); *G06F 9/505* (2013.01)

(58) Field of Classification Search
CPC ...................................... G06F 9/543

USPC ......................................................... 719/320
See application file for complete search history.

(56) References Cited

U.S. PATENT DOCUMENTS

| 2019/0286373 A1* | 9/2019 | Karumbunathan ..... G06F 3/065 |
| 2021/0006636 A1* | 1/2021 | Koehler .............. H04L 41/0806 |
| 2022/0019385 A1* | 1/2022 | Karr ...................... G06F 3/0607 |

OTHER PUBLICATIONS

Coviello, G., Rao, K., Sankaradas, M., & Chakradhar, S. (Nov. 9, 2021). DataX: A system for Data exchange and transformation of streams. In International Symposium on Intelligent and Distributed Computing (pp. 319-329). Springer, Cham.
"gRPC load balancing," (Jun. 15, 2017). [Online]. Available: https://grpc.io/blog/grpc-load-balancing/.

(Continued)

*Primary Examiner* — Timothy A Mudrick
(74) *Attorney, Agent, or Firm* — Joseph Kolodka

(57) ABSTRACT

A method for implementing application self-optimization in serverless edge computing environments is presented. The method includes requesting deployment of an application pipeline on data received from a plurality of sensors, the application pipeline including a plurality of microservices, enabling communication between a plurality of pods and a plurality of analytics units (AUs), each pod of the plurality of pods including a sidecar, determining whether each of the plurality of AUs maintains any state to differentiate between stateful AUs and stateless AUs, scaling the stateful AUs and the stateless AUs, enabling communication directly between the sidecars of the plurality of pods, and reusing and resharing common AUs of the plurality of AUs across different applications.

20 Claims, 6 Drawing Sheets

(56) References Cited

OTHER PUBLICATIONS

Ma, C. Y., Kadav, A., Melvin, I., Kira, Z., AlRegib, G., & Graf, H. P. (Jun. 18, 2018). Attend and interact: Higher-order object interactions for video understanding. In Proceedings of the IEEE Conference on Computer Vision and Pattern Recognition (pp. 6790-6800).
Van Eyk, E., Toader, L., Talluri, S., Versluis, L., Uță, A., & Iosup, A. (Oct. 4, 2018). Serverless is more: From paas to present cloud computing. IEEE Internet Computing, 22(5), 8-17.
Amazon, "AWS Lambda," last accessed Nov. 11, 2021. [Online]. Available: https://aws.amazon.com/lambda/.
Microsoft, "Azure serverless," last accessed Nov. 11, 2021. [Online]. Available: https://azure.microsoft.com/en-us/solutions/serverless/.
Google, "Serverless computing," last accessed Nov. 11, 2021. [Online]. Available: https://cloud.google.com/serverless.
"Apache openwhisk," last accessed Nov. 11, 2021. [Online]. Available: https://openwhisk.apache.org/.
Shi, W., & Dustdar, S. (May 13, 2016). The promise of edge computing. Computer, 49(5), 78-81.
Satyanarayanan, M. (Jan. 5, 2017). The emergence of edge computing. Computer, 50(1), 30-39.
R. Xie, Q. Tang, S. Qiao, H. Zhu, F. Richard Yu, and T. Huang, (Jul. 5, 2021). "When serverless computing meets edge computing: Architecture, challenges, and open issues," IEEE Wireless Communications, pp. 1-8.
Baresi, L., & Quattrocchi, G. (Jul. 15, 2021). PAPS: A serverless platform for edge computing infrastructures. Frontiers in Sustainable Cities, 3, 690660.
"Fission," last accessed Nov. 11, 2021. [Online]. Available: https://fission.io/.
"AWS Fargate," last accessed Nov. 11, 2021. [Online]. Available: https://aws.amazon.com/fargate.
"Lambda@Edge," last accessed Nov. 11, 2021. [Online]. Available: https://aws.amazon.com/lambda/edge/.
"Grpc," last accessed Nov. 11, 2021. [Online]. Available: https://grpc.io/.
"Protocol buffers," last accessed Nov. 11, 2021. [Online]. Available: https://developers.google.com/protocol-buffers.
"Snappy," last accessed Nov. 11, 2021. [Online]. Available: https://github.com/google/snappy.

\* cited by examiner

SYSTEM FOR APPLICATION SELF-OPTIMIZATION IN SERVERLESS EDGE COMPUTING ENVIRONMENTS

RELATED APPLICATION INFORMATION

This application claims priority to Provisional Application No. 63/279,020 filed on Nov. 12, 2021, the contents of which are incorporated herein by reference in their entirety.

BACKGROUND

Technical Field

The present invention relates to 5G networks and edge computing and, more particularly, to a system for application self-optimization in serverless edge computing environments.

Description of the Related Art

The exponential growth in smart sensors, and progress in 5G networks, is enabling a world that is awash with digital streams. A link exists between 5G and edge computing technologies to create a future that will be dominated by low-latency applications, personalized services, and real-time decisions. 5G increases cellular network speeds by up to ten times that of 4G. Edge computing offers a spectrum of compute capabilities between the sensors and the hyperscale cloud to reduce network latencies by processing application data closer to the end user or data sources.

SUMMARY

A method for implementing application self-optimization in serverless edge computing environments is presented. The method includes requesting deployment of an application pipeline on data received from a plurality of sensors, the application pipeline including a plurality of microservices, enabling communication between a plurality of pods and a plurality of analytics units (AUs), each pod of the plurality of pods including a sidecar, determining whether each of the plurality of AUs maintains any state to differentiate between stateful AUs and stateless AUs, scaling the stateful AUs and the stateless AUs, enabling communication directly between the sidecars of the plurality of pods, and reusing and resharing common AUs of the plurality of AUs across different applications.

A non-transitory computer-readable storage medium comprising a computer-readable program for implementing application self-optimization in serverless edge computing environments is presented. The computer-readable program when executed on a computer causes the computer to perform the steps of requesting deployment of an application pipeline on data received from a plurality of sensors, the application pipeline including a plurality of microservices, enabling communication between a plurality of pods and a plurality of analytics units (AUs), each pod of the plurality of pods including a sidecar, determining whether each of the plurality of AUs maintains any state to differentiate between stateful AUs and stateless AUs, scaling the stateful AUs and the stateless AUs, enabling communication directly between the sidecars of the plurality of pods, and reusing and resharing common AUs of the plurality of AUs across different applications.

A system for implementing application self-optimization in serverless edge computing environments is presented. The system includes a memory and one or more processors in communication with the memory configured to request deployment of an application pipeline on data received from a plurality of sensors, the application pipeline including a plurality of microservices, enable communication between a plurality of pods and a plurality of analytics units (AUs), each pod of the plurality of pods including a sidecar, determine whether each of the plurality of AUs maintains any state to differentiate between stateful AUs and stateless AUs, scale the stateful AUs and the stateless AUs, enable communication directly between the sidecars of the plurality of pods, and reuse and reshare common AUs of the plurality of AUs across different applications.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
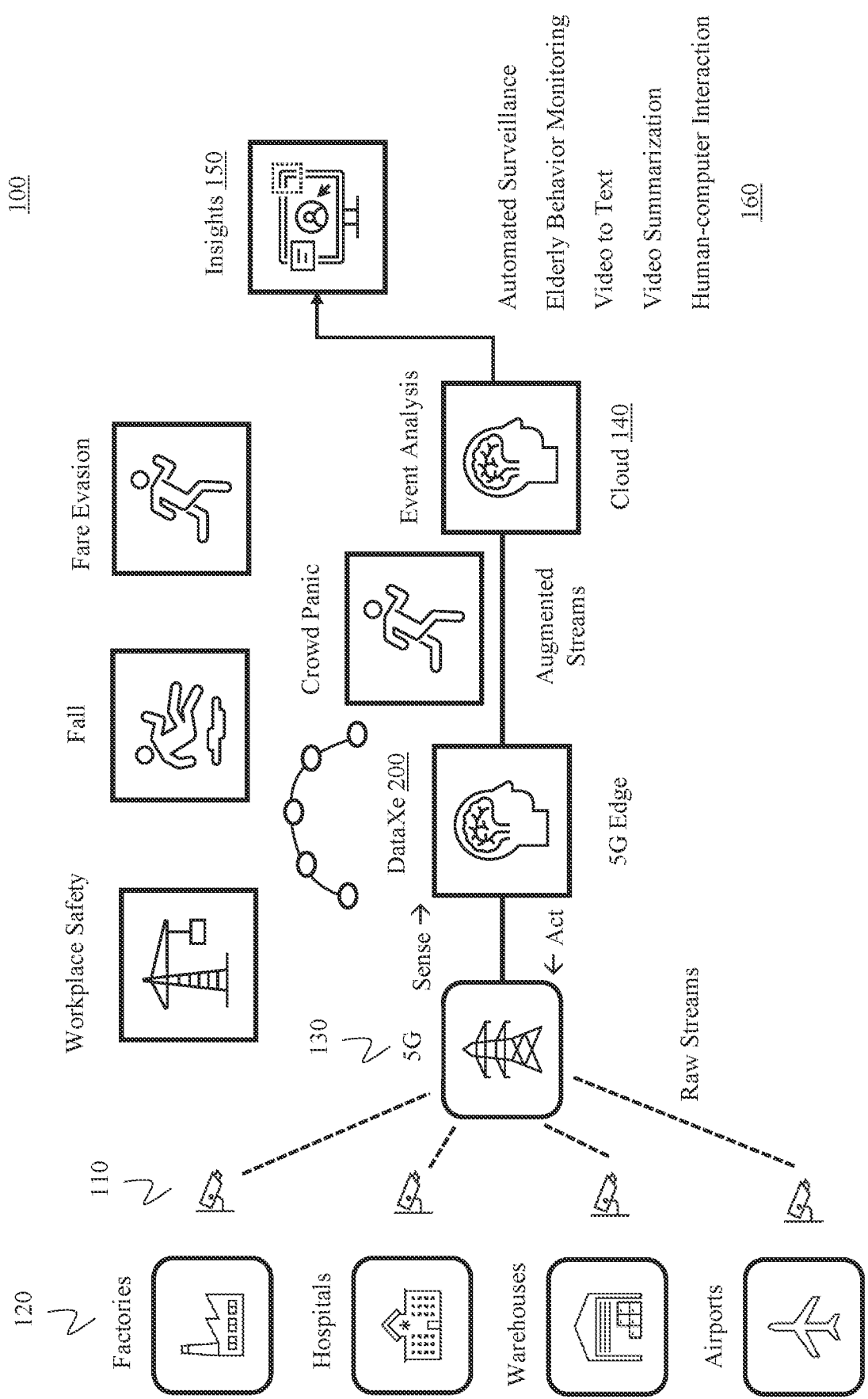
FIG. 1 is a block/flow diagram of an exemplary 5G and edge computing architecture for video analytics, in accordance with embodiments of the present invention.

Virtualized infrastructure and new business models on top of edge computing are the future. The edge is where 80% of all data is expected to be processed by 2025. The edge is also where people, things and computing are expected to connect to enable unprecedented, personalized services. The edge is where decisions can be made in real-time, and insights that enable immersive experiences like virtual or augmented reality are born. However, there are several challenges. Compared to the hyperscale cloud, edge computing has limited resources. The edge is also susceptible to network partitioning due to transient hiccups in the 5G network to the sensors, or the wide area networks to the hyperscale cloud. Furthermore, compared to about a dozen hyperscale cloud data centers today, a large global enterprise may have to manage hundreds or thousands of small, geographically dispersed edge processing environments, and dedicating IT staff for edge support is neither practical nor affordable. New tools that enable lights out operation of edge sites are necessary to operate edge compute sites remotely.

Among the various edge computing challenges, a key barrier to building performant, remotely managed and self-optimizing multi-sensor, distributed stream processing edge applications is high programming complexity. DataX was previously introduced as a platform that improves programmer productivity by enabling easy exchange, transformations, and fusion of data streams on virtualized edge computing infrastructure. DataX abstraction simplifies the application's specification and exposes parallelism and dependencies among the application functions (microservices). DataX runtime automatically sets up appropriate data communication mechanisms, enables effortless reuse of microservices and data streams across applications, and leverages serverless computing to transform, fuse, and auto-scale microservices. DataX makes it easy to write, deploy and reliably operate distributed applications at scale.

The exemplary embodiments of the present invention extend DataX to include serverless computing that automatically scales stateful and stateless analytics units (AUs) on virtualized edge environments, novel communication mechanisms that efficiently communicate data among analytics units, and new techniques to promote automatic reuse and sharing of analytics processing across multiple application pipelines in a lights out, serverless computing environment. Synthesizing these capabilities into a single platform has been substantially more transformative than any available stream processing system for the edge. This enhanced and efficient version of DataX is referred to as DataXe.

The exemplary embodiments further implemented a real-world video analytics application on DataXe and observed that the performance of the serverless computing DataXe implementation is about 3× better than a standalone implementation with custom, hand-crafted communication, multiprocessing and allocation of resources. Although the exemplary embodiments demonstrate the advantages of DataXe using a video analytics application, DataXe is not limited to only certain kinds of applications in specific domains. Techniques within DataXe are generic and any other application from any other domain can also very well benefit, when implemented on DataXe.

Various challenges faced in the design of mobile applications for efficient execution in serverless edge computing environments are presented.

The first challenge involves scaling of application microservices. When a developer requests DataXe to deploy a particular application pipeline on a set of sensors e.g., cameras, there are multiple instances of application microservices that must be spawned in order to handle processing of data from these set of cameras. How many instances of each microservice should be spawned, and how to scale these services in response to changes in data content of the various streams, is a challenging task. Poor estimates can lead to over-provisioning or under-provisioning of microservices, which can adversely affect the accuracy of insights from analytics processing.

The approach involves auto-scaling of stateless microservices that is easier than auto-scaling of stateful microservices (managing states across multiple cameras is a non-trivial task). Therefore, DataXe spawns an instance of a stateful microservice for each registered stream generated by the AU (one-to-one mapping), while there is no one-to-one mapping of registered stream to stateless microservices. Depending on the processing rate of input data streams, DataXe dynamically scales up or scales down the number of instances of stateless microservices to adequately process the camera streams.

The second challenge involves improving application-level efficiency at scale. An application includes multiple microservices, and an efficient application execution requires efficient processing as well as efficient communication. Efficient processing relates to the time spent in actual processing of useful tasks within microservices and efficient communication relates to communication of data within and across microservices. Handling and managing both simultaneously is a non-trivial task.

The approach involves DataXe aiding in monitoring and improving application-level performance by ensuring that most of the time is spent in performing useful tasks rather than waiting for I/O. The communication mechanisms used are high performant and at no given point in time, the microservices are idle or busy waiting. Such diligent handling of data within and across microservices ensures optimal performance of microservices and leads to improved application-level performance.

The third challenge involves improving system-level efficiency at scale. It could be thought that improving application-level performance would automatically achieve system-level performance. However, application-level and system-level performance are two different things. Consider two different applications, each performing a task, which is common across the two applications. To perform this common task, application-level performance improvement would focus on getting the processing and communication right. But, at a system level, the effort is duplicated to perform the common task. Such duplication is wasteful of processing resources, but it can also be problematic for video analytics applications. For example, video analytics applications include numerous artificial intelligence (AI) engines, which make extensive use of graphical processing units (GPUs) to execute deep learning-based AI models. These models consume a significant amount of memory resources in a GPU. If two different analytics pipelines are processing two different video streams, and an AI model (like object detection, for example) is common across the two analytics pipelines, then it may not be possible to load two copies of the AI model on a GPU due to lack of GPU memory. In such cases, one of the analytics pipelines will fail. Therefore, it is important for DataXe to recognize common AI models across different application pipelines and load only one copy of the model on the GPU. DataXe must manage the sharing of the GPU-processing of the AI model across different independent application pipelines. Thus, handling system-level performance is quite challenging and different from handling application-level performance.

The approach involves DataXe closely monitoring individual applications, including various microservices that are part of the application. For applications where there is a potential for reusing and sharing of microservices instances (on CPUs or GPUs), DataXe automatically creates a shared pool of microservice instances, while ensuring that the processing rate required by each video input stream is maintained. By creating a limited number of instances and sharing microservice instances across applications, the overall usage of system resources is optimized, thus improving system-level efficiency. As an example, for microservices using common deep learning models, only a single model is loaded in the GPU memory and is shared across applications, thereby preventing potential starving for resources or crashing of applications, which leads to improved system-level performance. Such sharing is enabled with appropriate consideration of security and privacy of each application pipeline.

FIG. 1 is a block/flow diagram of an exemplary 5G and edge computing architecture 100 for video analytics, in accordance with embodiments of the present invention.

The architecture 100 includes data received from a plurality of cameras 110 extracted from a plurality of locations 120, such as factories, hospitals, warehouses, airports, etc. The data is fed to a 5G network 130. The 5G network 130 communicates with DataXe 200, which process the data to provide insights 150 to a user.

Figure 2:
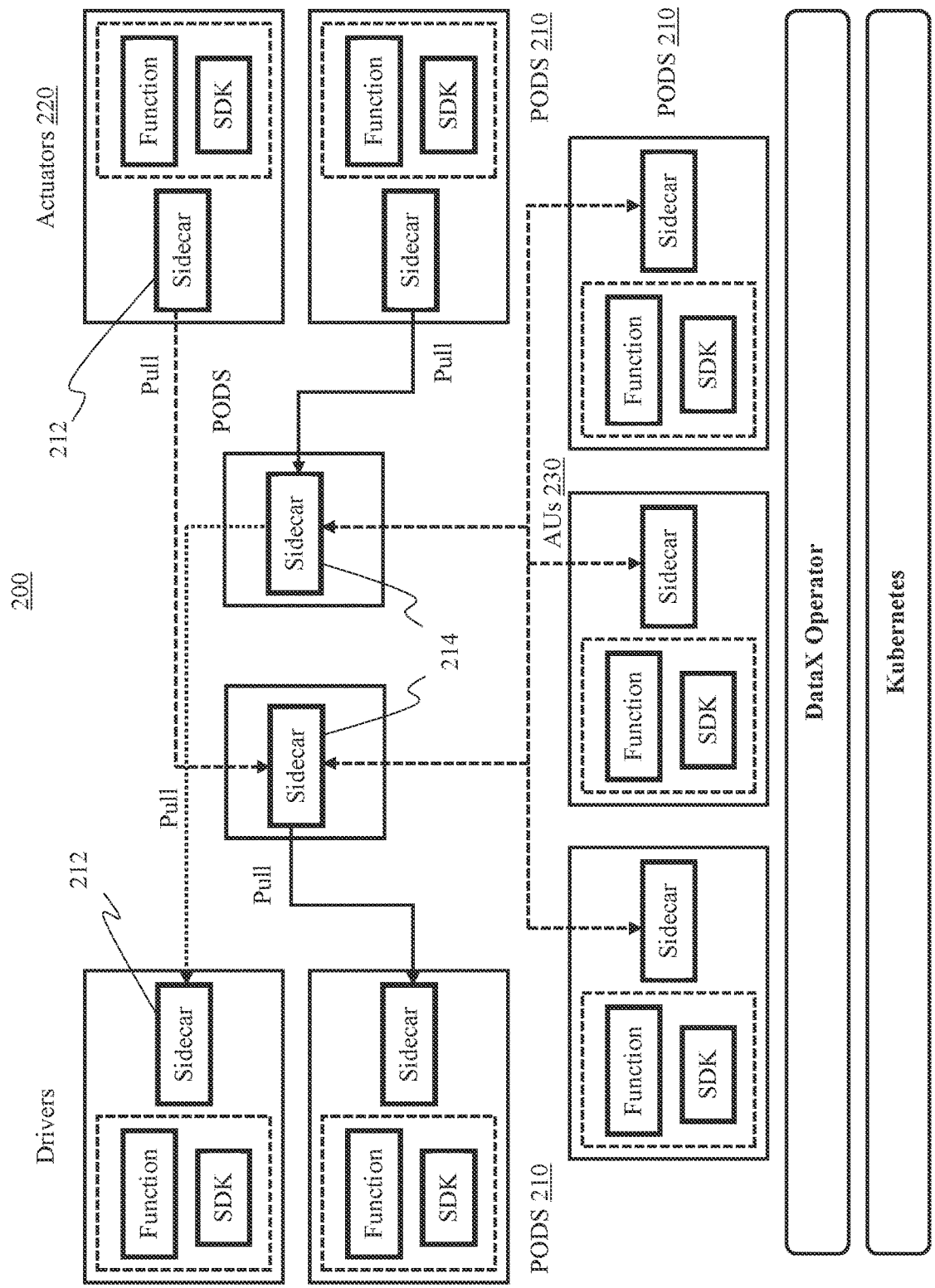
FIG. 2 is block/flow diagram of an exemplary DataXe system, in accordance with embodiments of the present invention.

FIG. 2 shows the system design of DataXe 200 with the various Kubernetes pods 210 and communication among analytics units 230 that is happening through sidecars 212 within these pods. The exemplary embodiments extend DataX by enabling scaling for stateful and stateless AUs, improving communication between AUs, and enabling reuse and sharing of AUs across multiple application pipelines.

Regarding scaling, an application usually includes a set of tasks, which are organized as a pipeline and the tasks are performed by individual analytics units or AUs. These AUs, depending on the task they perform, may or may not require maintaining a "state" within their business logic. Without knowing whether the AU has to maintain any state or not, it is impossible to make any intelligent scaling decisions. Realizing that this is an important aspect for scaling, DataXe 200 exposes application programming interfaces (APIs) to make it aware of whether an AU maintains or does not maintain any state. With this knowledge, DataXe 200 intelligently scales the AUs, especially the ones that do not maintain any state, i.e., stateless AUs. For stateful AUs, i.e., those that do maintain some "state," DataXe 200 creates exactly as many instances of the AU as the number of registered streams generated by the AU, thereby creating a one-to-one mapping between the stream and an instance of the stateful AU that generates it. For stateless AUs, DataXe 200 does not have this one-to-one mapping, rather the number of instances are scaled up or scaled down and only an optimal number of instances are maintained such that there is no over-provisioning or under-provisioning of instances. For this scaling, DataXe 200 leverages the Horizontal Pod Autoscalar (HPA) offered by Kubernetes.

Regarding communication, communication within DataXe 200 is significantly improved by not using a centralized message queue, but rather by having direct communication between various "sidecars," which gives DataXe 200 finer control to optimize communication overheads. DataXe 200 uses gRPC for exchanging messages, i.e., data transfer between drivers, AUs and actuators. gRPC is a modern open-source high performance Remote Procedure Call (RPC) framework that can run in any environment. gRPC can efficiently connect services in and across data centers with pluggable support for load balancing, tracing, health checking and authentication. gRPC is also applicable in last mile of distributed computing to connect devices, mobile applications and browsers to backend services.

gRPC is implemented on top of HTTP/2 and is increasingly becoming popular for communication between microservices. gRPC uses protocol buffers to define the structure of data being communicated across microservices in a .proto file, which is then used to generate the server and client stubs. Serialization, transmission of data over the network in binary format and deserialization during communication is handled by gRPC. There are several advantages of using gRPC, including, ease of use due to simpler service definition and support for multiple languages, efficient communication leading to reduced network latency, multiplexed and bidirectional communication support since it is implemented on top of HTTP/2 and wide community and infrastructure support.

The message format used by the sidecar 212 includes three fields, i.e., "data," "timestamp," and "stream." The entire output produced by a stream is considered as a blob and dumped or put into the "data" (type "bytes") field. The time when the data is produced is added to the "time" (type "google.protobuf.Timestamp") field and the name of the stream which produced the message is added to the "stream" (type "string") field.

One key optimization that DataXe 200 does is that it monitors the rate at which data is being pulled from the source (publisher) by any particular AU or actuator (subscriber) and adjusts the rate at which data is being processed and the output is published at the source. If the producer of data (publisher) is faster than the consumer (subscriber), then DataXe 200 automatically slows down the rate of production of data at source, thereby avoiding dropping of produced data and avoiding unnecessary processing whose output is never consumed.

As an example, consider a driver producing frames retrieved from a camera sensor and an AU performing object detection on these frames. If the object detection can only process 5 frames per second, then there is no need for the camera driver to decode and produce, say, 25 frames per second. All the effort to decode the additional 20 frames is wasted, since the object detection AU is incapable of consuming and processing them. Thus, by adjusting the data production rate at source (publisher) in accordance with the rate at which it can be consumed (subscriber), DataXe 200 transparently handles differential data rate (at publisher and subscriber) and optimizes overall utilization of system resources by avoiding unnecessary computation and production of data at the source.

Another optimization that DataXe 200 does is that before any data transfer, DataXe 200 compresses the data, and the data is uncompressed before it is delivered to the receiver. This reduces the total amount/size of data that is being transferred. DataXe 200 leverages Snappy for this compression and decompression of data. Since the applications are usually real-time, where the output needs to be produced quickly, the exemplary methods prioritize speed over maximum compression, which is what Snappy offers. Even though the exemplary methods prioritize for speed, a significant reduction in data size for several data streams is realized (extent of reduction in data size depends on the type of data stream being transferred). Snappy is a fast data compression and decompression library written in C++ by Google based on ideas from LZ77 and open-sourced in 2011. Snappy does not aim for maximum compression, or compatibility with any other compression library. Instead, Snappy aims for very high speeds and reasonable compression.

Regarding reuse and sharing, distributed systems and platforms in a serverless computing environment usually handle multiple different applications. It may sometimes happen that within the application pipeline, there could be some AUs, which are common across different applications or even within multiple instances of the same application. Without being aware of the components of the application pipeline, there would be duplication of instances of these AUs. DataXe 200, however, is aware of the various AUs that are part of the application pipeline and using this knowledge, DataXe 200 intelligently and transparently starts reusing and sharing these common AU instances across different applications.

For sharing of instances, DataXe 200 creates instances with just sidecars in them (sidecar-only instances). These sidecar-only instances communicate data to the actual AU instances that are shared across application pipelines. The AU instances process the data and send it back to the corresponding sidecar-only instance. Note that the number of shared instances can be different than the actual number of sidecar-only instances. As shown in FIG. 2, there are two sidecar-only instances 214 in the middle (corresponding to the two preceding drivers), which communicate data back and forth between three shared AU instances 230. The subsequent AUs or actuators in the application pipeline then communicate with the sidecar-only instances (two actuators 220 are shown in FIG. 2, which communicate with the middle two sidecar-only instances 214). In this way, by creating sidecar-only instances, sharing of AU instances is transparently handled by DataXe 200.

The exemplary embodiments consider a popular video analytics application that has been deployed as a service in many commercial settings (retail stores, construction sites, arenas, etc.), and illustrate the refactoring of the application for a serverless edge environment.

The exemplary embodiments refactored the standalone action recognition application on DataXe 200 using the abstractions (sensors, drivers, AUs and streams) exposed by DataXe 200. In the standalone version of the action recognition application, there is a coarse-grained component and a fine-grained component, which are later combined to perform action prediction. The exemplary embodiments then re-implement the same application and break the monolithic block into separate microservices, which are deployed as AUs on DataXe 200.

As shown in FIG. 1, the action recognition application receives video data streams over the 5G infrastructure 130, and the analytics processing occurs at the edge of the 5G network. Insights 150 from the analytics processing are the actions observed in the video streams, and these actions are forwarded to the cloud 140 for inclusion in other higher-level applications 160 like automated surveillance (public safety), elderly behavior monitoring (in assisted living or adult care homes), video to text or video summarization, and human-computer interaction.

Figure 3:
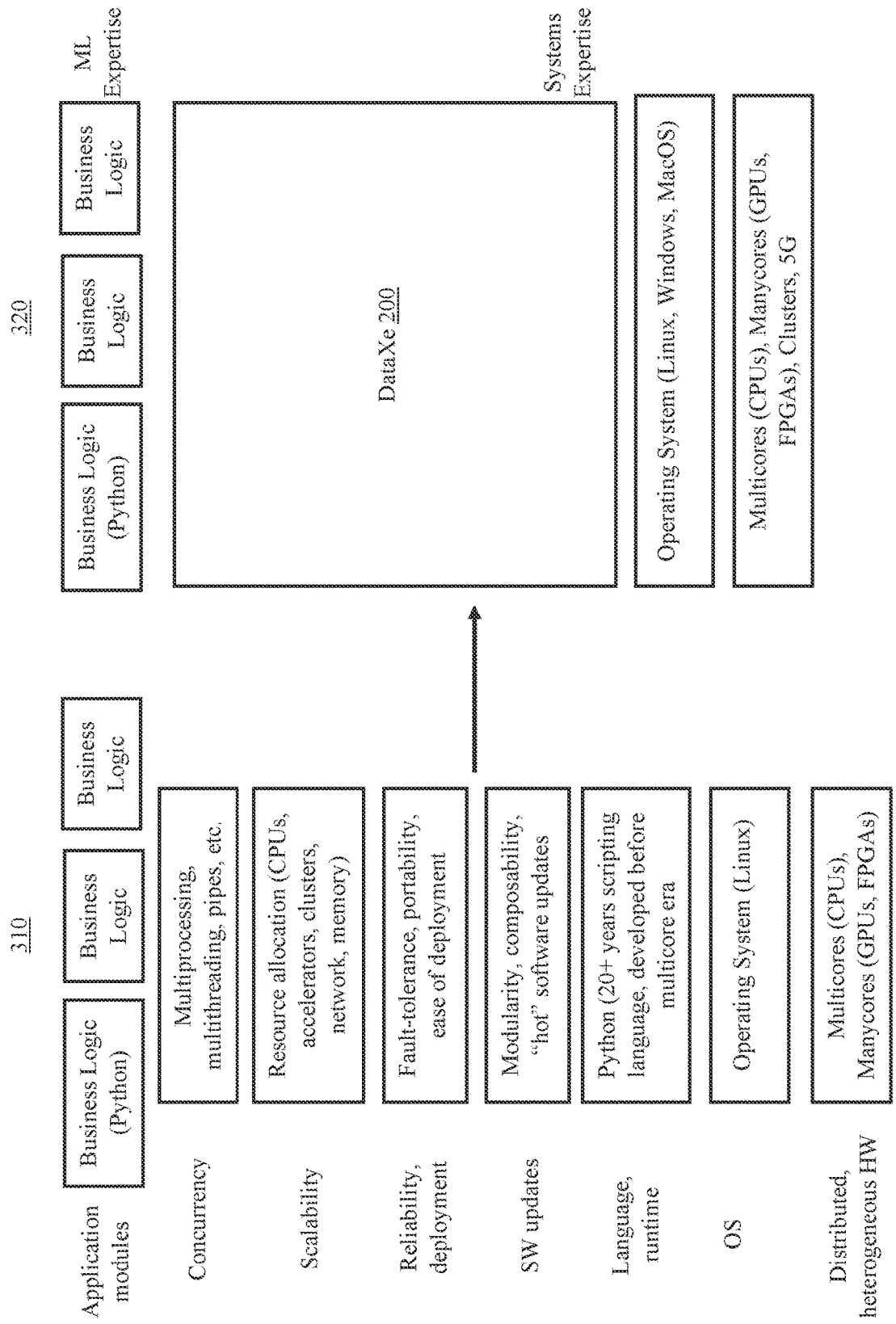
FIG. 3 is a block/flow diagram of a comparison between custom and DataXe versions of an edge application, in accordance with embodiments of the present invention.

FIG. 3 shows the concerns addressed by developers to design a custom implementation of a video analytics application like action recognition. Such applications make heavy use of AI engines and expertise in Machine Learning (ML) techniques is necessary to design action recognition pipelines that can detect a variety of actions with very high accuracy. Structure 310 shows the system-related concerns that a developer must address. These include concurrency (multiprocessing, multithreading, pipes, inter-process communication, etc.), scalability (resource allocation of CPUs, accelerators, VMs, network, memory, etc.), reliability (fault tolerance, portability, ease of deployment, etc.), SW updates, and updates of language runtime. Addressing the system related tasks is daunting for most ML practitioners. For example, some custom concurrency and scalability mechanisms were implemented, but a systematic consideration of all system related aspects is impractical.

Structure 320 shows the system-related aspects that are automatically handled by DataXe 200. For the action recognition application, the exemplary embodiments retain only the business logic in the original application and re-design the application by using the novel programming abstractions in DataXe 200. By using DataXe 200, developers with only ML expertise can quickly design scalable, and portable mobile applications for any serverless edge environment by leveraging middleware like DataXe 200.

Figure 4:
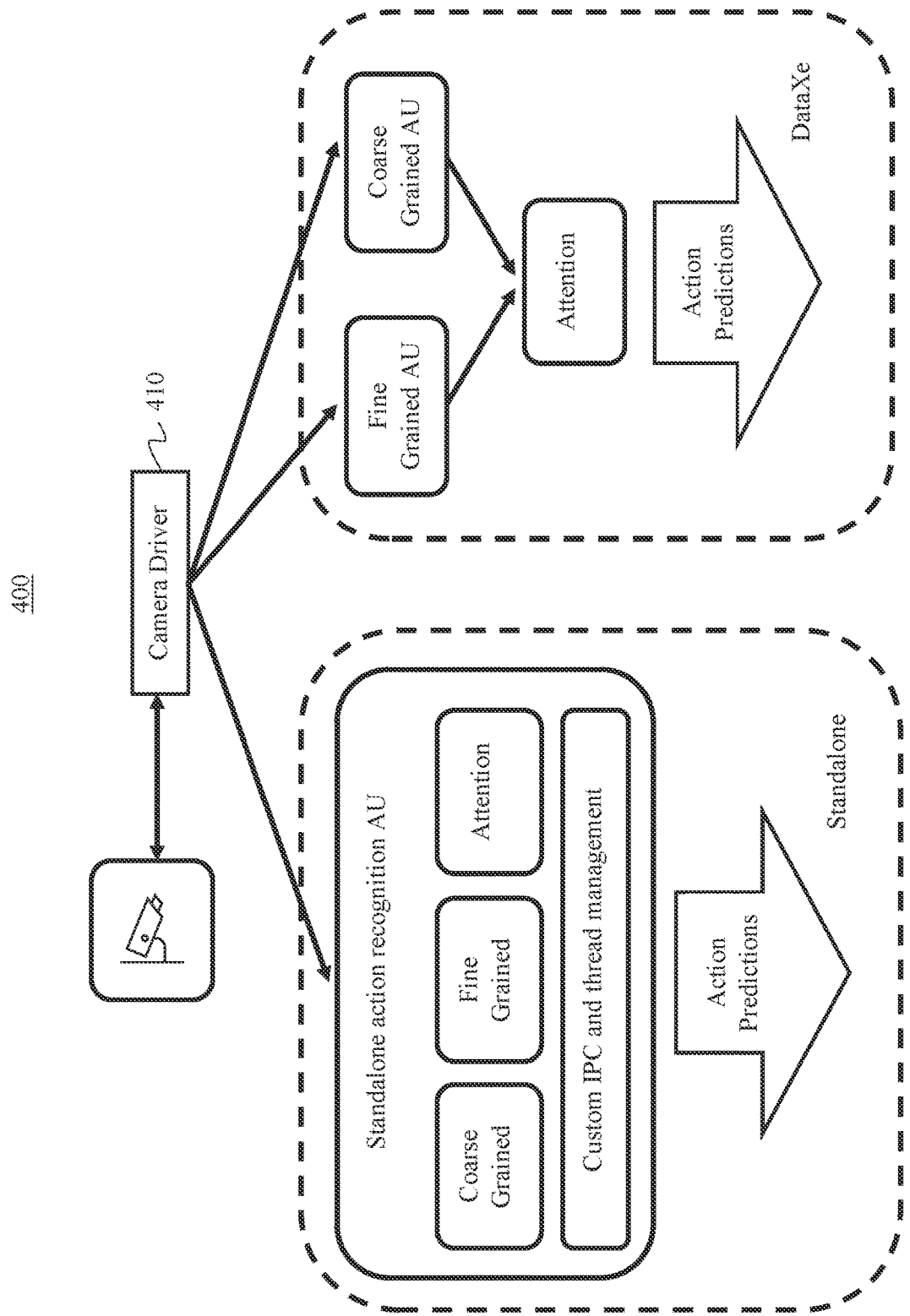
FIG. 4 is a block/flow diagram of an exemplary action recognition application pipeline, in accordance with embodiments of the present invention.

The action recognition application pipeline 400 is shown in FIG. 4. Frames from a "camera driver" 410 are passed on to the action recognition application. Standalone version is shown on the left and the version implemented on DataXe 200 is shown on the right. Standalone version is a custom implementation of the action recognition pipeline, which has three major components, that is, a "fine grained" analytics module that performs object detection and tracking, a "coarse grained" analytics module that extracts features for every tracked object, and an "attention" module that considers tracked objects and their features to determine the action in the video. In the standalone version, these modules are implemented as separate processes that communicate with each other through custom interprocess communication mechanisms like pipes. Furthermore, each process also has threads and thread management. On the other hand, in the DataXe version shown on the right, only the business logic in each module is implemented as an analytics unit, and these units use the optimized communication mechanisms within DataXe 200 to communicate, and auto-scaling techniques in DataXe 200 to appropriately scale each unit.

In conclusion, a key barrier to building performant, remotely managed and self-optimizing multi-sensor, distributed stream processing edge applications is high programming complexity. DataX was previously introduced as a platform that improves programmer productivity by enabling easy exchange, transformations, and fusion of data streams on virtualized edge computing infrastructure. The exemplary embodiments of the present invention extend DataX to include serverless computing that automatically scales stateful and stateless analytics units (AUs) on virtualized edge environments, novel communication mechanisms that efficiently communicate data among analytics units, and new techniques to promote automatic reuse and sharing of analytics processing across multiple applications in a lights out, serverless computing environment. Synthesizing these capabilities into a single platform has been substantially more transformative than any available stream processing system for the edge. This enhanced and efficient version of DataX is referred to as DataXe 200.

Figure 5:
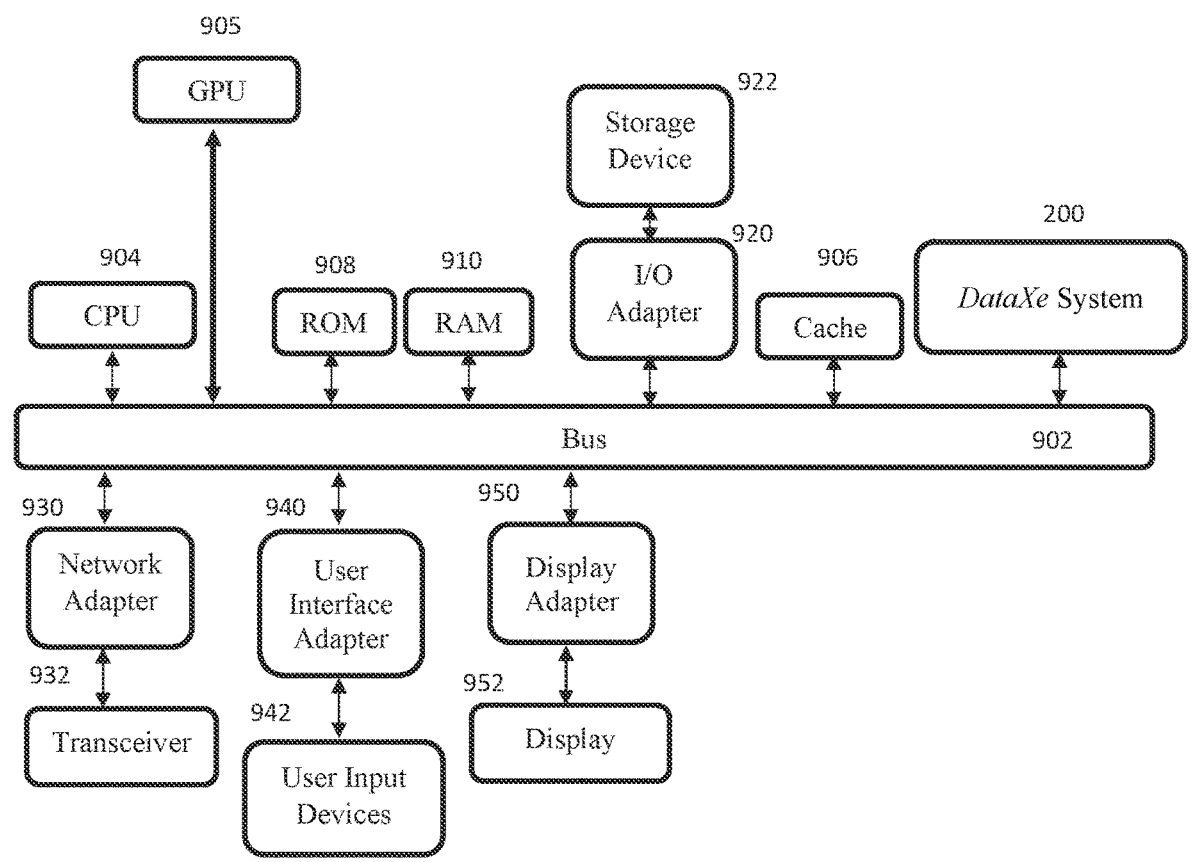
FIG. 5 is an exemplary processing system for implementing application self-optimization in serverless edge computing environments, in accordance with embodiments of the present invention.

FIG. 5 is an exemplary processing system for implementing application self-optimization in serverless edge computing environments, in accordance with embodiments of the present invention.

The processing system includes at least one processor (CPU) 904 operatively coupled to other components via a system bus 902. A Graphical Processing Unit (GPU) 905, a cache 906, a Read Only Memory (ROM) 908, a Random Access Memory (RAM) 910, an Input/Output (I/O) adapter 920, a network adapter 930, a user interface adapter 940, and a display adapter 950, are operatively coupled to the system bus 902. Additionally, DataXe 200 is connected to the bus 902.

A storage device 922 is operatively coupled to system bus 902 by the I/O adapter 920. The storage device 922 can be any of a disk storage device (e.g., a magnetic or optical disk storage device), a solid-state magnetic device, and so forth.

A transceiver 932 is operatively coupled to system bus 902 by network adapter 930.

User input devices 942 are operatively coupled to system bus 902 by user interface adapter 940. The user input devices 942 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 942 can be the same type of user input device or different types of user input devices. The user input devices 942 are used to input and output information to and from the processing system.

A display device 952 is operatively coupled to system bus 902 by display adapter 950.

Of course, the processing system may also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system are readily contemplated by one of ordinary skill in the art given the teachings of the present invention provided herein.

Figure 6:
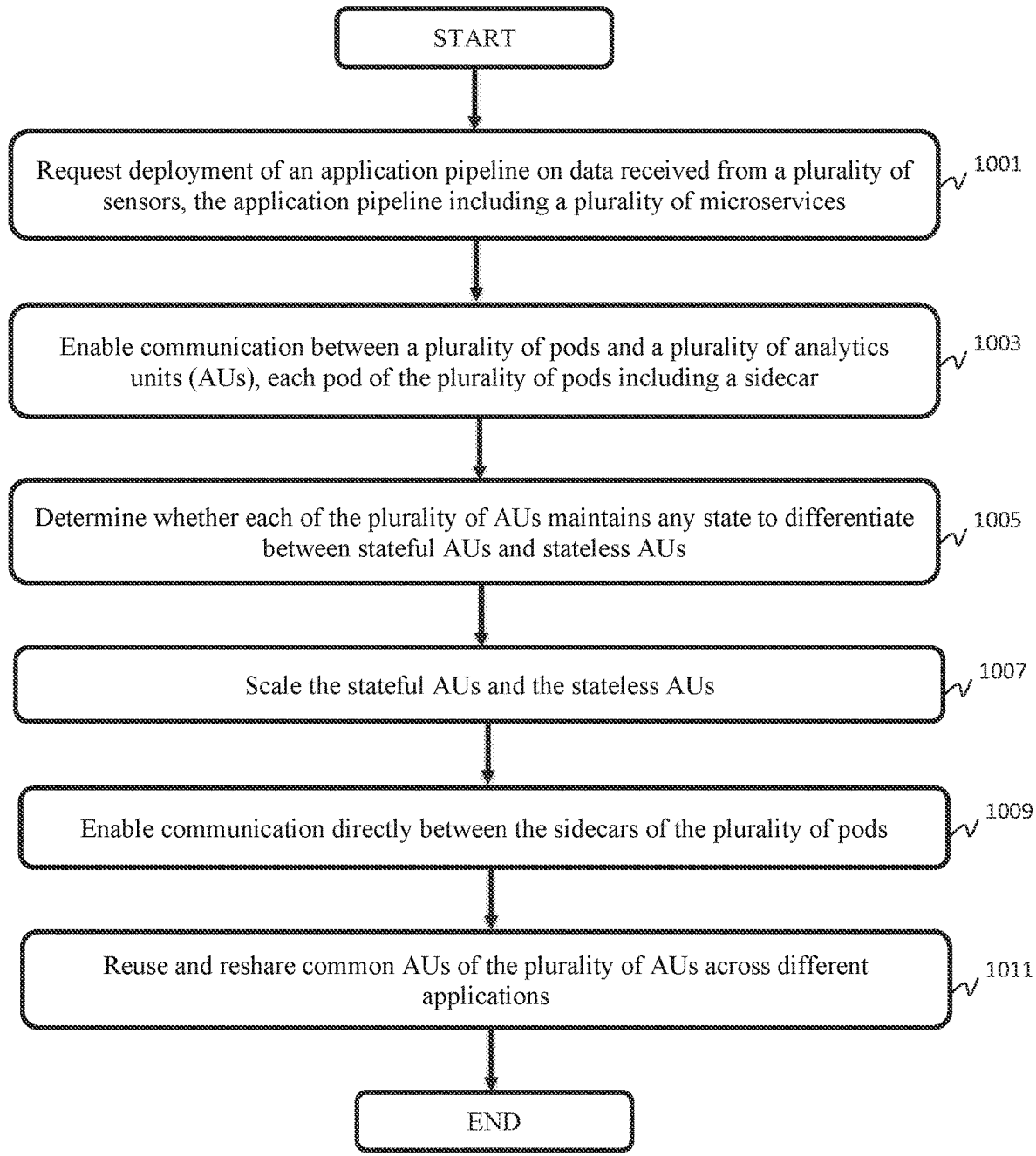
FIG. 6 is a block/flow diagram of an exemplary method for implementing application self-optimization in serverless edge computing environments, in accordance with embodiments of the present invention.

FIG. 6 is a block/flow diagram of an exemplary method for implementing application self-optimization in serverless edge computing environments, in accordance with embodiments of the present invention.

At block 1001, request deployment of an application pipeline on data received from a plurality of sensors, the application pipeline including a plurality of microservices.

At block 1003, enable communication between a plurality of pods and a plurality of analytics units (AUs), each pod of the plurality of pods including a sidecar.

At block 1005, determine whether each of the plurality of AUs maintains any state to differentiate between stateful AUs and stateless AUs.

At block 1007, scale the stateful AUs and the stateless AUs.

At block 1009, enable communication directly between the sidecars of the plurality of pods.

At block 1011, reuse and reshare common AUs of the plurality of AUs across different applications.

Therefore, DataXe simplifies deployment and self-optimizes application execution in serverless edge computing environments. With DataXe, developers can focus only on their business logic and system-related aspects are automatically and efficiently handled by DataXe. For a real-world video analytics application, the exemplary embodiments observed that an implementation on DataXe performs about 3× better than a standalone implementation with custom, hand-crafted communication, multiprocessing and allocation of edge resources.

As used herein, the terms "data," "content," "information" and similar terms can be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data can be received directly from another computing device or can be received indirectly via one or more intermediary computing devices, such as, for example, one or more servers, relays, routers, network access points, base stations, and/or the like.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "calculator," "device," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, RAM, ROM, an Erasable Programmable Read-Only Memory (EPROM or Flash memory), an optical fiber, a portable CD-ROM, an optical data storage device, a magnetic data storage device, or any suitable combination of the foregoing. In the context of this document, a computer readable storage medium may be any tangible medium that can include, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks or modules.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks or modules.

It is to be appreciated that the term "processor" as used herein is intended to include any processing device, such as, for example, one that includes a CPU and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for implementing application self-optimization in serverless edge computing environments, the method comprising:
   requesting deployment of an application pipeline on data received from a plurality of sensors, the application pipeline including a plurality of microservices;
   enabling communication between a plurality of pods and a plurality of analytics units (AUs), each pod of the plurality of pods including a sidecar;
   determining whether each of the plurality of AUs maintains any state to differentiate between stateful AUs and stateless AUs;
   scaling the stateful AUs and the stateless AUs;
   enabling communication directly between the sidecars of the plurality of pods; and
   reusing and resharing common AUs of the plurality of AUs across different applications.

2. The method of claim 1, further comprising, for the stateful AUs, creating exactly as many instances of the AU as a number of registered streams generated by the AU to create one-on-one mapping between a stream and an instance of the stateful AU that generates it.

3. The method of claim 1, further comprising, for the stateless AUs, scaling a number of instances up or down so that only an optimal number of instances are maintained to prevent over-provisioning or under-provisioning of instances.

4. The method of claim 1, further comprising monitoring a rate at which the data is being pulled from a source by a particular AU of the plurality of AUs and adjusting the rate at which the data is being processed to publish the output at the source.

5. The method of claim 4, wherein, if a producer of the data is faster than a consumer of the data, automatically slow down a rate of production of the data at the source to avoid dropping of produced data and to avoid unnecessary processing whose output is not consumed.

6. The method of claim 1, further comprising creating instances with just sidecars in them to communicate data to actual AU instances that are shared across different applications.

7. The method of claim 1, wherein each of the sidecars has a message format including a data field, a timestamp field, and a stream field, and an entire output produced by a stream is considered as a blob and put into the data field.

8. A non-transitory computer-readable storage medium comprising a computer-readable program for implementing application self-optimization in serverless edge computing environments, wherein the computer-readable program when executed on a computer causes the computer to perform the steps of:
   requesting deployment of an application pipeline on data received from a plurality of sensors, the application pipeline including a plurality of microservices;
   enabling communication between a plurality of pods and a plurality of analytics units (AUs), each pod of the plurality of pods including a sidecar;
   determining whether each of the plurality of AUs maintains any state to differentiate between stateful AUs and stateless AUs;
   scaling the stateful AUs and the stateless AUs;
   enabling communication directly between the sidecars of the plurality of pods; and
   reusing and resharing common AUs of the plurality of AUs across different applications.

9. The non-transitory computer-readable storage medium of claim 8, wherein, for the stateful AUs, create exactly as many instances of the AU as a number of registered streams generated by the AU to create one-on-one mapping between a stream and an instance of the stateful AU that generates it.

10. The non-transitory computer-readable storage medium of claim 8, wherein, for the stateless AUs, scale a number of instances up or down so that only an optimal number of instances are maintained to prevent over-provisioning or under-provisioning of instances.

11. The non-transitory computer-readable storage medium of claim 8, wherein a rate at which the data is being pulled from a source by a particular AU of the plurality of AUs is monitored and the rate at which the data is being processed is adjusted to publish the output at the source.

12. The non-transitory computer-readable storage medium of claim 11, wherein, if a producer of the data is faster than a consumer of the data, automatically slow down a rate of production of the data at the source to avoid dropping of produced data and to avoid unnecessary processing whose output is not consumed.

13. The non-transitory computer-readable storage medium of claim 8, wherein instances with just sidecars in them are created to communicate data to actual AU instances that are shared across different applications.

14. The non-transitory computer-readable storage medium of claim 8, wherein each of the sidecars has a message format including a data field, a timestamp field, and a stream field, and an entire output produced by a stream is considered as a blob and put into the data field.

15. A system for implementing application self-optimization in serverless edge computing environments, the system comprising:
a memory; and
one or more processors in communication with the memory configured to:
request deployment of an application pipeline on data received from a plurality of sensors, the application pipeline including a plurality of microservices;
enable communication between a plurality of pods and a plurality of analytics units (AUs), each pod of the plurality of pods including a sidecar;
determine whether each of the plurality of AUs maintains any state to differentiate between stateful AUs and stateless AUs;
scale the stateful AUs and the stateless AUs;
enable communication directly between the sidecars of the plurality of pods; and
reuse and reshare common AUs of the plurality of AUs across different applications.

16. The system of claim 15, wherein, for the stateful AUs, create exactly as many instances of the AU as a number of registered streams generated by the AU to create one-on-one mapping between a stream and an instance of the stateful AU that generates it.

17. The system of claim 15, wherein, for the stateless AUs, scale a number of instances up or down so that only an optimal number of instances are maintained to prevent over-provisioning or under-provisioning of instances.

18. The system of claim 15, wherein a rate at which the data is being pulled from a source by a particular AU of the plurality of AUs is monitored and the rate at which the data is being processed is adjusted to publish the output at the source.

19. The system of claim 18, wherein, if a producer of the data is faster than a consumer of the data, automatically slow down a rate of production of the data at the source to avoid dropping of produced data and to avoid unnecessary processing whose output is not consumed.

20. The system of claim 15, wherein instances with just sidecars in them are created to communicate data to actual AU instances that are shared across different applications.

* * * * *